April 29, 1969      F. DRUSEIKIS      3,440,679
LOW PROFILE CONCEALED ARTICULATING WIPER-WASHER ASSEMBLY
Filed March 14, 1968      Sheet 1 of 2
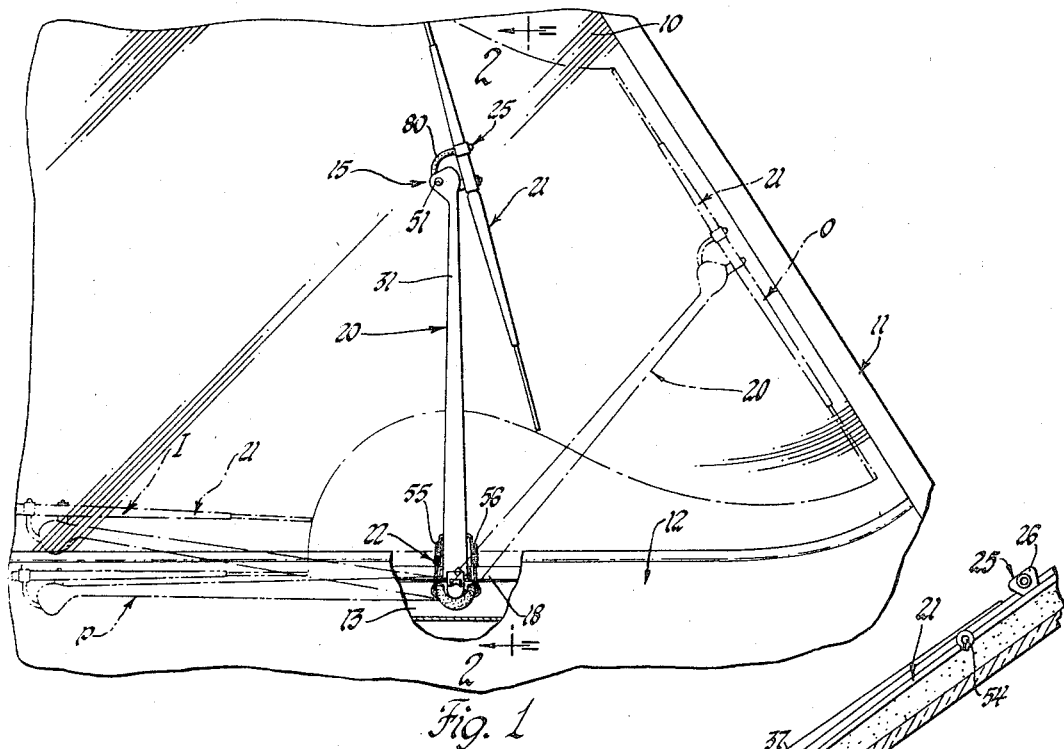
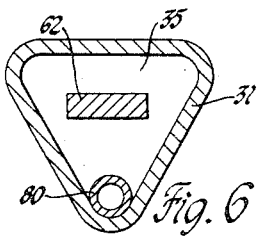
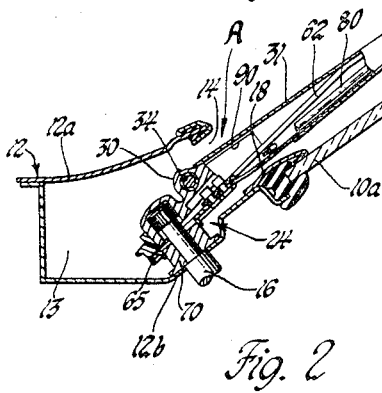
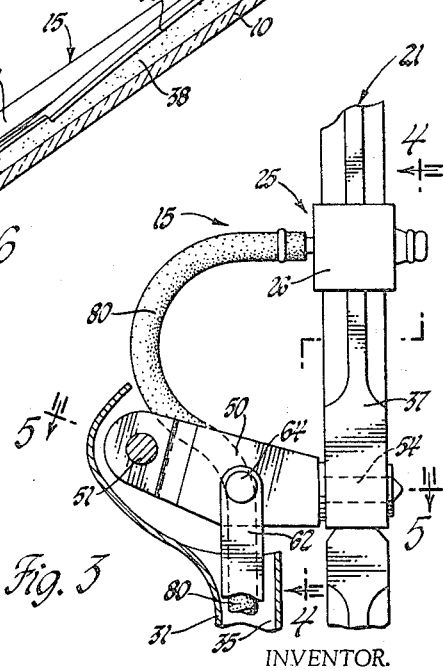
INVENTOR.
Frederick Druseikis
BY
W. A. Schuetz
ATTORNEY INVENTOR.
Frederick Druseikis
BY
W. A. Schuetz
ATTORNEY United States Patent Office 3,440,679
Patented Apr. 29, 1969

3,440,679
LOW PROFILE CONCEALED ARTICULATING WIPER-WASHER ASSEMBLY
Frederick Druseikis, Kettering, Ohio, assignor to General Motors Corporation, Detroit, Mich., a corporation of Delaware
Filed Mar. 14, 1968, Ser. No. 713,145
Int. Cl. B60s *1/52, 1/34*
U.S. Cl. 15—250.04          8 Claims

ABSTRACT OF THE DISCLOSURE

In a preferred form, a low profile wiper-washer assembly for cleaning a window of an automotive vehicle and which is adapted to be concealed within a well adjacent an edge of the window when not in use is disclosed. The wiper-washer assembly comprises a tubular wiper arm which is adapted to be connected with an oscillatable drive pivot and a wiper blade assembly which is pivotally connected to the wiper arm for movement about axes extending substantially parallel and substantially normal to the plane of the window. The wiper blade of the wiper blade assembly is biased and maintained in engagement with the window at a substantially constant pressure when oscillated thereacross by a spring means located externally of the wiper arm. The wiper blade assembly carries a washer nozzle supplied with washing fluid via a conduit extending through the wiper arm and the wiper blade assembly is moved relative to the wiper arm by an articulating link of an articulating means, the articulating link also extending through the wiper arm whereby both the conduit and link are substantially concealed from view.

---

The present invention relates to window cleaning mechanisms for a vehicle, and in particular to a wiper-washer assembly for cleaning a window of a vehicle when oscillated thereacross and which is adapted to be disposed within a well adjacent an edge of the window when not in use to conceal the same from view.

Many present day windshield wiper assemblies for cleaning a vehicle windshield, especially curved windshields, include an oscillatable wiper arm having pivotally interconnected inner and outer sections and a wiper blade assembly pivotally connected to the outer section of the wiper arm and which readily conforms to the varying curvature of the windshield when oscillated thereacross. The wiper blade assembly is biased and maintained in engagement with the windshield at a substantially constant pressure throughout its movement thereacross by a spring connected with the inner and outer wiper arm sections and which is located internally of the wiper arm. It has been found that such wiper assemblies provide a highly efficient wiping of the area of the windshield traversed thereby.

Moreover, many of these present day wiper assemblies also include an articulating linkage located externally and generally parallel to the wiper arm for moving the wiper blade assembly relative to the wiper arm about an axis extending generally normal to the windshield so that an increased area of the windshield adjacent its lateral side portions can be effectively wiped. Also, some of these present day wiper assemblies include a washer fluid dispensing means comprising a conduit extending through the wiper arm and a washer nozzle mounted on the wiper assembly for dispensing washing fluid onto the windshield and in the path of movement of the wiper blade. Locating the washer nozzle in close proximity with the windshield improves the efficiency of the washer operation, since it insures that all or substantially all of the washing fluid dispensed hits the windshield in the path of movement of the wiper.

The wiper-washer assembly of the present invention is an improvement over the above described assemblies presently in use. The wiper-washer assembly, in the preferred embodiment, not only provides all of the advantages of the present day assemblies, but is constructed and arranged such that both the washer conduit and articulating linkage are located within the wiper arm so as to be substantially concealed from view and that the spring means for maintaining the wiper blade assembly in substantially constant pressure engagement with the windshield or other window is arranged externally of the wiper arm adjacent the drive pivot. This construction and arrangement minimizes obstruction of the driver's view when oscillated across the windshield of the vehicle and enables the assembly to be made so as to have a low profile. This latter provision enables the access opening for the well in which the wiper-washer assembly is to be parked to be made relatively narrow, which in turn improves the aesthetic or styling appearance of the vehicle.

Accordingly, an important object of the present invention is to provide a new and improved wiper-washer assembly for cleaning a window of an automotive vehicle and which is adapted to be concealed within a well adjacent an edge of the window when not in use, and which not only provides all of the above noted advantages of the present day wiper-washer assemblies, but also minimizes obstruction of the driver's view during operation and has a relatively narrow profile to enable the well to be provided with a relatively narrow access opening.

Another object of the present invention is to provide a new and improved window cleaning mechanism in which the wiper blade assembly is maintained in engagement with the window at a substantially constant pressure throughout its operating strokes by a spring means, the washing fluid is supplied to a nozzle carried by the wiper blade assembly via a conduit extending through the wiper arm and in which the wiper blade assembly is articulated to increase the area of the glass wiped by an articulating link extending through the wiper arm whereby both the conduit and articulating link are substantially concealed from view.

Yet another object of the present invention is to provide a new and improved window cleaning mechanism which is adapted to be concealed when not in use and which includes a wiper arm having a mounting section which is adapted to be connected with a drive pivot and a wiper blade assembly carrying section pivotally connected to the mounting section for movement toward and from the window to be cleaned, and in which the wiper blade assembly is biased and maintained in pressure engagement with the window throughout its running strokes by a spring means operatively connected with the two sections of the wiper arm and which is disposed externally along the opposite side walls of the wiper arm and below the axis of the pivotal connection between the two sections of the wiper arm.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification, and in which similar reference numerals or characters are employed to designate corresponding parts throughout the several views of each embodiment, and in which:

FIGURE 1 is a fragmentary front elevational view of a vehicle embodying the preferred form of novel window cleaning mechanism of the present invention;

FIGURE 2 is an enlarged fragmentary sectional view, with portions shown in elevation, taken approximately along line 2—2 of FIGURE 1.

FIGURE 3 is an enlarged fragmentary elevational view, with portions shown in section, of part of the window cleaning mechanism shown in FIGURE 1.

FIGURE 6 is an enlarged sectional view taken approximately along line 6—6 of FIGURE 2;

Figure 4:
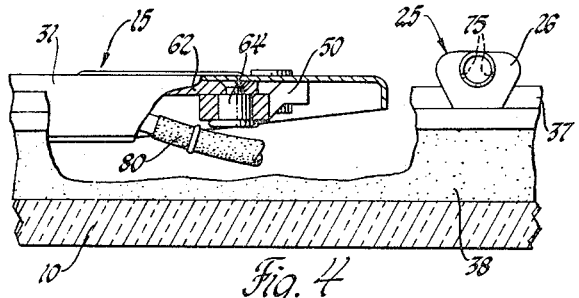
FIGURE 4 is a fragmentary sectional view taken approximately along line 4—4 of FIGURE 3.

The present invention provides novel vehicle window cleaning mechanisms. The window cleaning mechanisms can be used for cleaning the front window or windshield of the vehicle, the rear window of the vehicle or the rear window of a station wagon, and is especially adapted for use in vehicles provided with a well or recess adjacent an edge of the window to be cleaned and in which the window cleaning mechanism is adapted to be disposed so as to be concealed from view when not in use.

As representing a preferred embodiment of the present invention, FIGURES 1 and 2 of the drawings show a window cleaning mechanism A for cleaning a curved, front window or windshield 10 of an automotive vehicle 11. The windshield is progressively curved in a rearward direction with respect to the vehicle proceeding from its center toward its lateral sides. The vehicle 11 includes suitable body structure, generally designated by reference numeral 12, which supports the lower edge 10a of the windshield 10 and which defines a well or recess 13 extending transversely of the vehicle adjacent the lower edge 10a of the windshield 10. The well 13 has an elongated, narrow, slot or access opening 14 adjacent the lower edge 10a of the windshield 10 and preferably a substantially open bottom through which water, snow, etc. wiped from the windshield 10 can pass and then fall toward the road surface. The structure 12 defining the well 13 includes an upper part or portion 12a terminating in front of the windshield 10, which portion would either be part of the vehicle cowl or the rearwardmost part of the hood of the vehicle.

The window cleaning mechanism A comprises a wiper-washer assembly 15 for cleaning the windshield 10 and which is connected to an oscillatable drive pivot 16. The oscillatable drive pivot 16 is rotatably supported in any suitable manner by the vehicle and projects into the interior of the well 13. The drive pivot 16 is adapted to be oscillated to oscillate the wiper-washer assembly 15 across the windshield during running operation between inboard and outboard positions, as shown by the phantom lines in FIGURE 1 and indicated by the letters I and O, respectively. The drive pivot 16 is also adapted to be rotated to move the wiper-washer assembly 15 from its inboard position I to a depressed parked position within the well 13, as shown by the dotted lines and indicated by the reference letter P in FIGURE 1, when running operation is terminated. A smoothly curved metal molding 18 extending transversely of the vehicle 11 and from the lower edge 10a of the windshield 10 to the adjacently located wall 12b of the well 13 is provided to guide the wiper-washer assembly 15 into the well 13.

The drive pivot 16 can be oscillated to move the wiper-washer assembly 15 across the windshield 10 between its inboard and outboard positions I and O during running operation and to its depressed parked position P when running operation is terminated by any suitable or conventional drive means, such as the drive means disclosed in U.S. Patent No. 2,985,024. Although only a single wiper-washer assembly 15 for cleaning the right half of the windshield 10 is illustrated in FIGURE 1, it will, of course, be understood that a duplicate assembly for cleaning the other half of the windshield would be provided.

The wiper-washer assembly 15 comprises, in general, a wiper arm 20 connected with the drive pivot 16, a wiper blade assembly 21 carried by the wiper arm 20 and engageable with the windshield 10, a spring means 22 for biasing and maintaining the wiper blade assembly 21 in engagement with the windshield 10 at a substantially constant pressure when oscillated thereacross, an articulating means 24 for articulating the wiper blade assembly 21 relative to the wiper arm 20 as it is moved across the windshield 10 to increase the area wiped by the wiper blade assembly 21, and a dispensing means 25 including a washer nozzle 26 carried by the wiper blade assembly 21 for dispensing washing fluid onto the windshield 10.

The wiper arm 20 comprises an inner or mounting section 30 which is secured in any suitable or conventional manner to the drive pivot 16 and an outer or blade assembly carrying section 31 which is pivotally connected at its lower end to the upper end of the inner section 30 by a pivot pin means 34 for movement toward and from the plane of the windshield 10. The outer section 31 is in the form of a tube having a longitudinally extending through opening 35 therethrough. The tube 31 could be of any suitable cross-sectional shape and, in the illustrated embodiment (see FIGURE 6), has a cross-sectional shape of an inverted triangle.

The wiper blade assembly 21 is carried by the wiper arm 20 and comprises a blade carrier or holder means 37 for supporting a wiper blade 38. The wiper blade assembly 21 can be of any suitable or conventional type which readily conforms to the varying curvature of the curved windshield 10.

Figure 5:
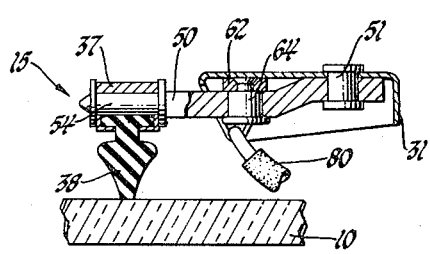
FIGURE 5 is a fragmentary sectional view taken approximately along line 5—5 of FIGURE 3.
Figure 7:
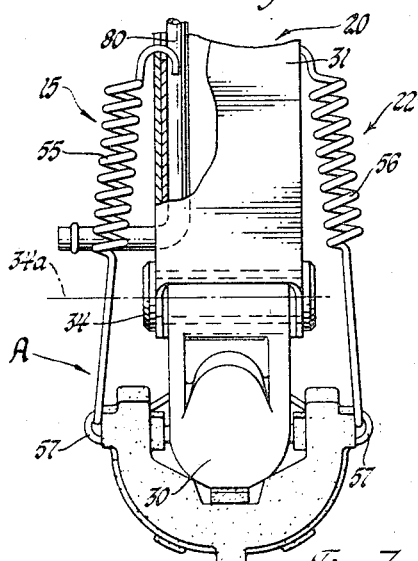
FIGURE 7 is an enlarged fragmentary elevational view of part of the window cleaning mechanism shown in FIGURE 1.

As best shown in FIGURES 1, 3, and 5, the wiper blade assembly 21 is pivotally supported by the upper section 31 of the wiper arm 20 for movement about an axis extending substantially parallel to the plane of the windshield 10 and is disposed laterally to one side of the section 31 so as to lie in substantially the same plane as the section 31. To this end, a support lever 50 having one end pivotally connected to the upper wall (see FIGURE 5) of the tube 31 by a pivot pin means 51 is provided. The lever 50 at its other end carries a pin 54 which is pivotally connected to the blade carrier 37 of the wiper blade assembly 21 to enable the latter to pivot about an axis extending substantially parallel to the plane of the windshield 10. The provision of the pivot pin means 51 also enables the wiper blade assembly 21 to be pivoted relative to the wiper arm 20 about an axis extending substantially normal to the plane of the windshield 10 to enable the same to be articulated, and in a manner hereinafter more fully described.

Figure 8:
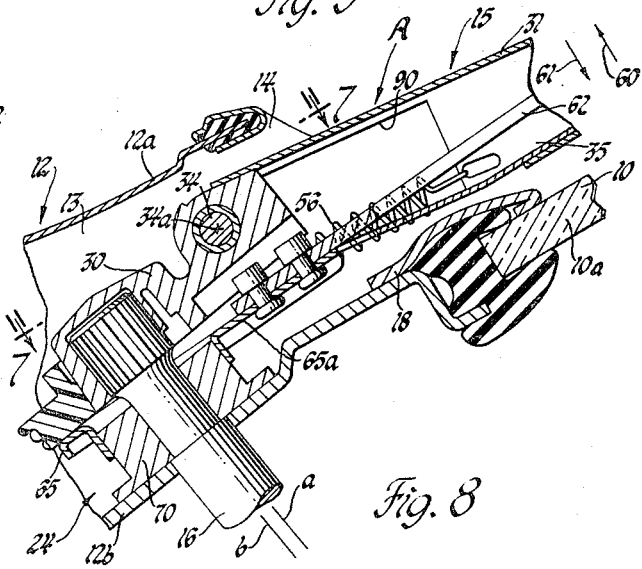
FIGURE 8 is an enlarged view of part of the window cleaning mechanism shown in FIGURE 2.

The wiper blade assembly 21 is biased toward and maintained in substantially constant pressure engagement with the windshield 10 throughout its oscillatory movement thereacross by the srping means 22. The spring means 22 comprises a pair of coiled tension springs 55 and 56 of identical length and disposed on opposite sides of the wiper arm 20. The springs 55 and 56 each have one end connected with an ear 57 on the side of the section 30 and the other end connected or hooked to the adjacent side wall of the upper section 31. As best shown in FIGURE 8, the end connections of the springs 55 and 56 are such that they extend below the axis 34a of the pivot pin means 34 and thus, they bias the upper section 31 and blade assembly 21 toward the windshield.

The substantially constant pressure engagement between the blade 38 and the windshield is obtained as a result of the spring force of the springs 55 and 56 automatically changing as the moment arm of the upper section 31, i.e., the distance between the pivot axis 34a and the springs 55 and 56, as measured normal to the springs, is varied due to the upper section 31 being pivoted about the axis 34a as the blade 38 traverses the curved windshield 10. As the blade 38 is being oscillated toward its inboard position I, the upper section 31 pivots about the axsi 34a in the direction of the arrow 60, which in turn decreases the moment arm and causes the springs 55 and 56 to expand. As the blade 38 is being oscillated toward its outboard position O, the upper section 31 pivots about the axis 34a of the pivot pin 34 in the direction of the arrow 61, which increases the moment arm and allows the springs 55 and 56 to contact. The changes in the moment arm and the extent of the expansion or contraction of the springs 55 and 56 are such that the pressure engagement between the blade 38 and the windshield 10 remains substantially the same.

As best shown in FIGURE 1, the blade assembly 21 is also articulated, i.e., pivoted about the axis of the pivot pin means 51 relative to the wiper arm 20, as the latter is moved across the windshield between its inboard and outboard positions I and O. This is effected by the articulating means 24 which includes an articulating link 62 which extends through the longitudinally extending through opening 35 in the upper section 31 of the wiper arm 20. The link 62 at its upper end is pivotally connected by a pivot pin 64 to the lever 50 at a location spaced from its pivotal connection with the upper section 31 of the wiper arm 20 and is connected at its inner end to a radially extending flange 65a of a sleeve 65. The sleeve 65 is slidably or rotatably disposed on a stationary eccentric cam 70. The eccentric cam 70 is in the form of an annular ring surrounding the drive pivot 16 and is suitably secured to the wall 12b. The eccentric cam has its central axis spaced from the central axis of the drive pivot 16, the difference between these axes being indicated by the letters *a* and *b* in FIGURE 8, respectively. The eccentric cam 70 is angularly positioned with respect to the drive pivot 16 so that its high point is aligned or substantially aligned with the longitudinal axis of the wiper arm 20 when the latter is in its outboard position O so that maximum articulation occurs at the latter position.

The articulating means 24 functions to move the wiper blade assembly 21 relative to the wiper arm 20 throughout its movement between its inboard and outboard positions I and O. The wiper blade assembly 21 when in its inboard position I is substantially parallel to the longitudinal axis of the wiper arm 20 and as it is moved from its inboard position I toward its outboard position O, the included angle therebetween progressively increases until the wiper arm is aligned with the high point on the eccentric cam 70, which occurs at the outboard position O. This articulation of the wiper blade assembly 21 increases the area of the windshield 10 wiped by the blade 38 adjacent the lateral side of the windshield 10.

As previously mentioned, the windshield cleaning mechanism A also includes a dispensing means 25 for dispensing washing fluid onto the windshield 10 and in the path of movement of the wiper blade 38. The dispensing means 25 includes a plastic nozzle means 26 mounted on the blade holder 37 of the wiper blade assembly 21. The nozzle 26 includes a plurality of apertures 75 which direct the washing fluid in the form of jets against the windshield 10 when supplied with washing fluid. The nozzle means is in communication with a selectively operable pump (not shown) via a flexible conduit means 80 which extends through the longitudinally through opening 35 in the wiper arm 20. The conduit means 80 at its upper end is connected to the nozzle 26 and at its lower end extends through a slot 90 in the side wall of the outer section 31.

The pump (not shown) for supplying washing fluid to the conduit means 80 from a suitable reservoir can be of any suitable or conventional construction, such as the pump shown in application Ser. No. 701,443, filed Jan. 29, 1968 and assigned to the same assignee as the present application.

Figure 10:
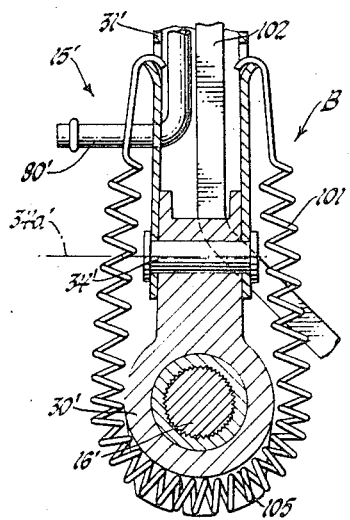
FIGURE 10 is a sectional view, with portions shown in elevation, and taken approximately along line 10—10 of FIGURE 9.
Figure 9:
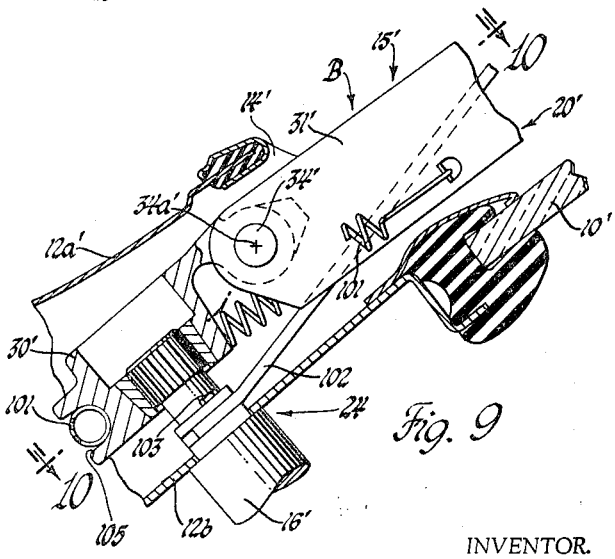
FIGURE 9 is a sectional view like that shown in FIGURE 8, but showing another embodiment.

As representing another embodiment of the present invention, FIGURES 9 and 10 of the drawings show a windshield cleaning mechanism B. The windshield cleaning mechanism B is of a substantially identical construction to the windshield cleaning mechanism A except that that spring means comprises only a single spring 101 and except that the articulating means includes a link 102 having its inner end pivotally secured to the wall 12b by a pivot pin means 103. The other parts of the windshield cleaning mechanism B have been given the same reference numerals as the corresponding parts of the windshield cleaning mechanism A, but with a prime affixed thereto.

The single coil spring 101 is disposed within an arcuate peripheral groove 105 in the inner or mounting section 30' and has its two opposite ends connected wtih the opposite side walls of the upper or blade assembly carrying section 31'. The spring 101 also is disposed beneath the axis 34a' of the pivot pin 34'. The pivoatl connection 103 of the link 102 is positioned with respect to the drive pivot 16' such that maximum articulation of the wiper blade assembly occurs when the wiper arm 20' is aligned with the outboard position of the wiper-washer assembly 15'. The operation of the windshield cleaning mechanism B is the same as that previously described above in connection with window cleaning mechanism A.

From the foregoing, it should be apparent that the wiper-washer assemblies of the windshield cleaning mechanisms A and B not only provide a highly effective wiping action for removing water, etc. from the area of the windshield being wiped thereby, increase the area of the glass wiped adjacent the lateral side of the windshield and a highly efficient dispensation of washing fluid onto the windshield, but also provide wiper-washer assemblies which minimize obstruction of the driver's view when operated and which have a low profile, as viewed in side elevation, so as to enable the same to be moved through a narrow access opening 14 in the well 13. Obstruction to the driver's view is minimized as a result of both the washer conduit means and the articulating link being disposed within the wiper arm. A lower profile is achieved by disposing the blade assembly 21 to one side of the arm disposing the spring means externally of the arm. By being able to minimize the width of the access opening 14 of the well 13, the aesthetic appearance of the vehicle is enhanced.

Moreover, it should be noted that the spring means of the windshield cleaning mechanisms A and B are at least substantially disposed within the well 13 and therefore, substantially concealed from view. Furthermore, it should be noted that the apex of the tube serves as a cradle to position and resist displacement of the washer conduit means during operation of the windshield cleaning mechanisms.

It should also be noted that the windshield or other window could be extended down into the well of the body structure and the wiper-washer assembly parked on the glass windshield or window. In such a structure, the inboard position of the wiper-washer assembly would preferably correspond to the parked position P shown in FIGURE 1 and the drive means connected with the drive pivot would move the assembly to its inboard position within the well upon termination of operation.

Although the illustrated embodiments of the present invention have been described in great detail, it should be apparent that certain modifications, changes, and adaptations may be made therein without departing from the spirit of the present invention.

What is claimed is:

1. In an automotive vehicle having a window terminating in a lower edge, vehicle body structure defining a well extending transversely of said vehicle and having an elongated access opening adjacent the lower edge of the window and a window cleaning mechanism for cleaning said window, said window cleaning mechanism including an oscillatable drive pivot carried by the vehicle and projecting into said well, a wiper arm connected with said drive pivot and comprising a first section and a second section, said wiper arm being oscillatable across said window when said drive pivot is oscillated and being disposed within said well in a parked position when oscillatory movement of said drive pivot is terminated, a wiper blade assembly carried by said wiper arm and including a wiper blade for wiping the windshield when said wiper arm is oscillated thereacross, said first section of said wiper arm being pivotally connected to said second section for movement about an axis toward and from the plane of said windshield, and spring means operatively connected with said second section and opposed side wall portions of said first section of said wiper arm for biasing said first section toward the plane of said windshield and maintaining said wiper blade in engagement with the windshield at a substantially constant pressure throughout its oscillatory movement thereacross, said spring means being disposed externally of said wiper arm and extending along the opposed side walls of said first section and beneath said axis.

2. In an automotive vehicle as defined in claim 1 wherein said spring means includes a pair of linearly extending coil springs respectively located externally along the opposite side wall portions of said wiper arm.

3. In an automotive vehicle as defined in claim 1 wherein said spring means comprises a single coil spring having its opposite ends respectively connected with the opposite side wall portions of the first section of said wiper arm and with its intermediate portion extending around said drive pivot and being supported by said second section of said wiper arm.

4. In an automotive vehicle having a window terminating in a lower edge, vehicle body structure defining a well extending transversely of said vehicle and having an elongated access opening adjacent the lower edge of the window and a window cleaning mechanism for cleaning said window, said window cleaning mechanism including an oscillatable drive pivot carried by the vehicle and projecting into said well, a wiper arm connected with said drive pivot, said wiper arm being oscillatable across said window when said drive pivot is oscillated and being disposed within said well in a parked position when oscillatory movement of said drive pivot is terminated, said wiper arm having a longitudinally extending through opening, a wiper blade assembly pivotally supported by said wiper arm for movement relative thereto about an axis extending generally normal to the plane of the window and including a wiper blade for wiping the windshield when said wiper arm is oscillated thereacross, articulating means including a link extending through said opening in said wiper arm and pivotally connected with said wiper blade assembly for controlling movement of said wiper blade assembly relative to said arm as the latter is being oscillated across the window, a washer nozzle means carried by said wiper blade assembly, a flexible conduit in communication with said washer nozzle means and which is adapted to be supplied with washing fluid under pressure, said conduit also extending through said opening in said wiper arm whereby both said link and said conduit are substantially concealed.

5. In an automotive vehicle having a window terminating in a lower edge, vehicle body structure defining a well extending transversely of the vehicle and provided with an elongated access opening adjacent the lower edge of the window, and a window cleaning mechanism including an oscillatable drive pivot carried by the vehicle and projecting into the well and a window cleaning mechanism for cleaning said window, said window cleaning mechanism including an oscillatable drive pivot and a wiper-washer assembly connected to said drive pivot, said assembly being oscillatable across the window when the drive pivot is oscillated and being disposed within the well in a parked position when oscillatory movement of the drive pivot is terminated, said wiper-washer assembly comprising a wiper arm having a mounting section which is adapted to be connected with the drive pivot and a blade assembly carrying section pivotally connected to the mounting section for movement toward and from the window and which has a longitudinally extending through opening therethrough, a wiper blade assembly carried by said blade assembly carrying section and being disposed laterally from one side wall of said blade assembly carrying section, said wiper blade assembly being pivotally supported by said blade assembly carrying section for movement about an axis extending generally parallel to the plane of the window, spring means connected with said mounting section and said blade assembly carrying section from biasing said blade assembly carrying section toward the plane of the windshield and for maintaining the wiper blade assembly in engagement with the window at a substantially constant pressure throughout its oscillatory movement thereacross, said spring means being disposed externally of said wiper arm and extending along the opposite side walls thereof, a washer nozzle carried by said wiper blade assembly, a conduit in communication with said nozzle means and extending through the longitudinal opening in said blade assembly carrying section, said conduit being adapted to be connected with a source of washing fluid, means for also pivotally supporting said wiper blade assembly for pivotal movement about an axis extending generally normal to the plane of the window, and an articulating means including a link extending through said opening in said wiper blade assembly carrying section for moving said blade assembly about said axis extending generally normal to the plane of the window relative to the wiper arm as the latter is being moved across the window.

6. In an automotive vehicle as defined in claim 5 wherein said articulating means further includes a stationary cam eccentrically disposed around said drive pivot and a sleeve secured to said articulating link and rotatably disposed on said cam.

7. A low profile wiper-washer assembly for cleaning a window in an automotive vehicle when moved thereacross comprising: a wiper arm having a first section which is adapted to be connected with a movable drive member and a second section pivotally connected to said first section for movement toward and from the window, a wiper blade assembly pivotally connected to said second section of said wiper arm for movement about an axis extending substantially parallel to the plane of the window, said wiper blade assembly being disposed laterally from one side wall of the second section, spring means operatively connected with said first and second sections for biasing said second section toward the plane of the window and for maintaining the wiper blade assembly in engagement with the window at a substantially constant pressure throughout its movement thereacross, said spring means being disposed externally of the wiper arm and extending along the opposed side walls of said second section, said second section having a longitudinally extending through opening therethrough, a washer nozzle means carried by said wiper blade assembly, and a conduit in communication with said nozzle means and which extends through the opening in said second section, said conduit being adapted to be connected with a source of washing fluid.

8. A low profile wiper-washer assembly window cleaner as defined in claim 7 and including a lever for pivotally connecting said wiper blade assembly to said second section of the wiper arm for movement about an axis extending generally normal to the plane of the window, and articulating means including a link extending through said opening in said second section and connected with said lever at a location remote from its pivotal connection with said second section, said articulating means being adapted to move said wiper blade assembly relative to the wiper arm when the latter is moved across the window.

References Cited

UNITED STATES PATENTS

| | | | |
|---|---|---|---|
| 2,313,203 | 3/1943 | Marais | 15—250.23 |
| 2,849,742 | 9/1958 | Gores | 15—250.23 |
| 2,885,710 | 5/1959 | Brasty | 15—250.34 |
| 3,149,361 | 9/1964 | Ziegler | 15—250.04 XR |
| 3,213,478 | 10/1965 | Pollock | 15—250.19 XR |

PETER FELDMAN, *Primary Examiner.*

U.S. Cl. X.R.

15—250.19, 250.23, 250.34, 250.35